United States Patent
Yukawa et al.

[19]

[11] Patent Number: 6,137,698
[45] Date of Patent: Oct. 24, 2000

[54] SWITCHING POWER SUPPLY AND METHOD OF CONTROLLING VOLTAGE INDUCED ACROSS SECONDARY WINDING OF TRANSFORMER

[75] Inventors: Tadashi Yukawa; Nobuhiro Tada, both of Hanno, Japan

[73] Assignee: Shindengen Electric Manufacturing Co., Ltd., Tokyo, Japan

[21] Appl. No.: 09/161,830

[22] Filed: Sep. 29, 1998

[30] Foreign Application Priority Data

Sep. 30, 1997 [JP] Japan ..................................... 9-283088

[51] Int. Cl.[7] ......................... H02M 3/336; H02M 7/217
[52] U.S. Cl. ................................ 363/25; 363/89; 363/127
[58] Field of Search ................................. 363/24, 25, 26, 363/126, 127, 81, 84, 89, 128

[56] References Cited

U.S. PATENT DOCUMENTS

| | | | |
|---|---|---|---|
| 4,953,068 | 8/1990 | Henze | 363/17 |
| 5,774,350 | 6/1998 | Notaro et al. | 363/89 |
| 5,815,384 | 9/1998 | Hammond et al. | 363/26 |
| 5,907,481 | 5/1999 | Svardsjo | 363/25 |

FOREIGN PATENT DOCUMENTS

| | | | |
|---|---|---|---|
| 55-109174 | 8/1980 | Japan | 363/127 |
| 7-308062 | 11/1995 | Japan | |
| 8501161 | 3/1985 | WIPO | 363/127 |

*Primary Examiner*—Adolf Deneke Berhane
*Attorney, Agent, or Firm*—Armstrong, Westerman, Hattori, McLeland & Naughton

[57] ABSTRACT

A switching power supply has a secondary rectifying circuit including two MOS transistors which can operate in a third quadrant for use as low-loss rectifying devices. While the MOS transistors are operating in the third quadrant, the application of a gate voltage to the MOS transistors is forcibly stopped to turn off the MOS transistors. Periods in which the MOS transistors operate in the third quadrant are prevented from overlapping each other. The periods in which the MOS transistors operate in the third quadrant may be established by an ON timer, and the periods in which the MOS transistors remain de-energized may be established by an OFF timer.

17 Claims, 9 Drawing Sheets

*FIG.1a*

Prior Art

*FIG.1b*

Prior Art

SWITCHING POWER SUPPLY AND METHOD OF CONTROLLING VOLTAGE INDUCED ACROSS SECONDARY WINDING OF TRANSFORMER

BACKGROUND OF THE INVENTION

1. Field of the Invention

The present invention relates to the art of switching power supplies, and more particularly to a highly efficient switching power supply.

2. Description of the Related Art

Switching power supplies include forward switching power supplies, multiple-transistor switching power supplies, RCC switching power supplies, etc. One type of these switching power supplies has a secondary rectifying circuit for converting AC electric energy generated by a transformer into DC electric energy by way of full-wave rectification.

A conventional multiple-transistor push-pull switching power supply of the full-wave rectification type will be described below with reference to FIGS. 1a and 1b.

Figure 1A:
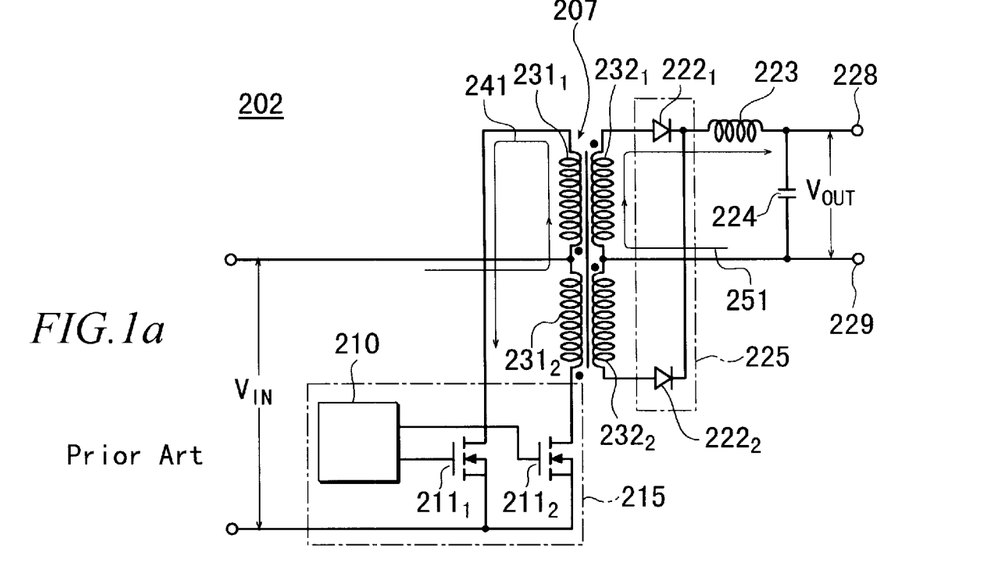
FIGS. 1a and 1b are block diagram showing the manner in which a conventional switching power supply operates.
Figure 1B:
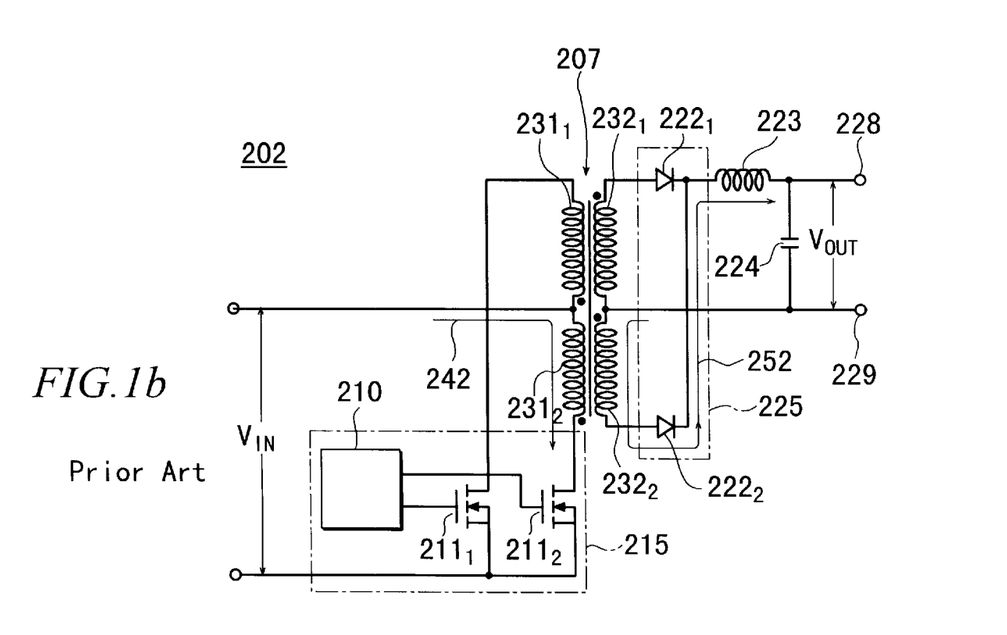

FIGS. 1a and 1b show the conventional multiple-transistor push-pull switching power supply, generally denoted by 202, which comprises a transformer 207, a primary switching circuit 215, and a secondary rectifying circuit 225.

The transformer 207 is of a central-type structure and comprises first and second primary windings $231_1$, $231_2$ and first and second secondary windings $232_1$, $232_2$ which are magnetically coupled to the first and second primary windings $231_1$, $231_2$.

The primary switching circuit 215 comprises a control circuit 210 and first and second primary transistors $211_1$, $211_2$.

Each of the first and second primary transistors $211_1$, $211_2$ comprises an n-channel MOS transistor. The control circuit 210 is connected to the first and second primary transistors $211_1$, $211_2$, for applying voltages individually to the gate terminals of the first and second primary transistors $211_1$, $211_2$.

The first and second primary transistors $211_1$, $211_2$ have respective source terminals connected to each other and respective drain terminals connected respectively to ends of the first and second primary windings $231_1$, $231_2$ whose other ends are connected to each other.

A primary rectifying and smoothing circuit (not shown) is connected to a primary side of the switching power supply 202. The primary rectifying and smoothing circuit keeps the source terminals of the first and second primary transistors $211_1$, $211_2$ at a ground potential, and applies an input voltage $V_{IN}$ to the junction between the first and second primary windings $231_1$, $231_2$. When the control circuit 210 turns on the first primary transistor $211_1$, a current flows through the first primary winding $231_1$, and when the control circuit 210 turns on the second primary transistor $211_2$, a current flows through the second primary winding $231_2$.

The secondary rectifying circuit 225 comprises first and second diodes $222_1$, $222_2$. The first and second diodes $222_1$, $222_2$ have respective anodes connected to respective ends of the first and second secondary windings $232_1$, $232_2$ whose other ends are connected to each other. The first and second diodes $222_1$, $222_2$ have respective cathodes connected to each other.

A secondary smoothing circuit comprising a choke coil 223 and a smoothing capacitor 224 is connected to a secondary side of the switching power supply 202. The choke coil 223 has an end connected to the interconnected cathodes of the first and second diodes $222_1$, $222_2$ and an opposite end connected to an end of the smoothing capacitor 224.

The smoothing capacitor 224 has an opposite end connected to the junction between the first and second secondary windings $232_1$, $232_2$. The ends of the smoothing capacitor 224 serve as an output terminal 228 and a ground terminal 229.

When the first primary transistor $211_1$ is turned on and the second primary transistor $211_2$ is turned off, a current flows along a path 241 in the primary side of the switching power supply 202.

At this time, the first diodes $222_1$ is forward-biased and the second diode $222_2$ is reverse-biased by a voltage induced across the first and second secondary windings $232_1$, $232_2$. Therefore, the voltage is induced across the first secondary windings $232_1$ by magnetic energy transferred from the first primary windings $231_1$ to the first secondary windings $232_1$. A current flows through the first diode $222_1$ into the choke coil 223 along a path 251 in the secondary side of the switching power supply 202, charging the capacitor 224. As a result, a DC output voltage $V_{OUT}$ appears between the output terminal 228 and the ground terminal 229.

FIG. 1b shows how the switching power supply 202 operates when the first primary transistor $211_1$ is turned off and the second primary transistor $211_2$ is turned on. In FIG. 1b, a current flows through the second primary windings $231_2$ and the second primary transistors $211_2$ along a path 242 in the primary side of the switching power supply 202.

When the current flows through the second primary windings $231_2$, the first diodes $222_1$ is reverse-biased and the second diode $222_2$ is forward-biased by a voltage induced across the second secondary winding $232_2$. As a result, a current into the choke coil 223 along a path 252 in the secondary side of the switching power supply 202, charging the capacitor 224.

When the first and second primary transistors $211_1$, $211_2$ of the primary switching circuit 215 are alternately energized, currents flow alternately in the first and second diodes $222_1$, $222_2$ of the secondary rectifying circuit 225, and are smoothed by the choke coil 223 and the smoothing capacitor 224, thereby producing the DC output voltage $V_{OUT}$ between the output terminal 228 and the ground terminal 229.

In recent years, there has been a demand for making the switching power supply 202 more efficient. In order to meet such demands, attempts have been made to employ Schottky diodes as the first and second diodes $222_1$, $222_2$.

However, since the Schottky diodes have low forward conduction voltages, though the loss is small, their reverse leakage current increases as their temperature increases. Because the temperature of the Schottky diodes further rises due to such a reverse leakage current, the Schottky diodes tend to cause thermal runaway.

If the switching power supply 202 is applied to resonant power supplies which have been developed in recent years, then a sine-wave current is supplied to the first and second primary transistors $211_1$, $211_2$ to thereby to reduce a loss in the primary side. As later described, MOS transistors are used as the first and second diodes $222_1$, $222_2$, and operated in a third quadrant to thereby rectify a current induced in the secondary windings so as to reduce a loss in the secondary side.

Figure 2A:
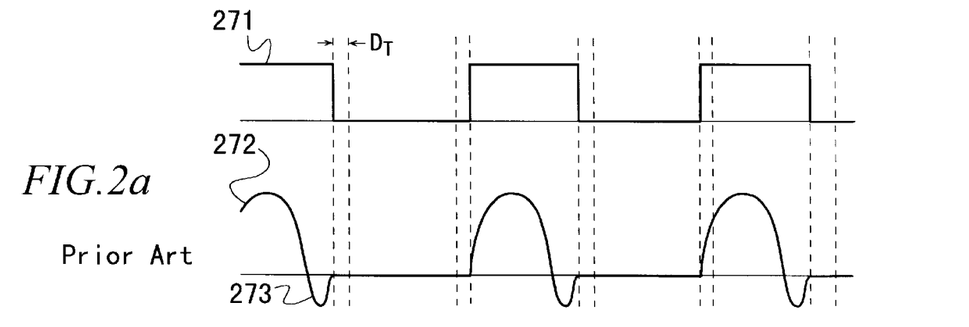
FIGS. 2a and 2b are diagrams showing the waveforms of currents flowing in the conventional switching power supply.

FIG. 2a of the accompanying drawings show the waveform 271 of a voltage applied to the gate terminal of the first primary transistor $211_1$ (or the second primary transistor $211_2$), and the waveform 272 of a current flowing through the first diode $222_1$ (or the second diode $222_2$) of the secondary rectifying circuit 225.

In a resonant power supply, gate voltages are also alternately applied to the first and second primary transistors $211_1$, $211_2$ to render them conductive alternately. During dead times $D_T$, however, no gate voltage is applied to either one of the first and second primary transistors $211_1$, $211_2$, so that their conduction periods will not overlap each other.

The voltage and current waveforms shown in FIG. 2a are produced when the switching power supply 202 is under a light load. The secondary diode $222_1$, which comprises a MOS transistor, passes the current 272 to rectify the voltage induced across the secondary winding $232_1$, and thereafter operates as a transistor to pass a current 273 in a reverse direction. The reverse current 273 flows while the primary transistor $211_1$ is being rendered conductive when the switching power supply 202 is under a light load.

Figure 2B:
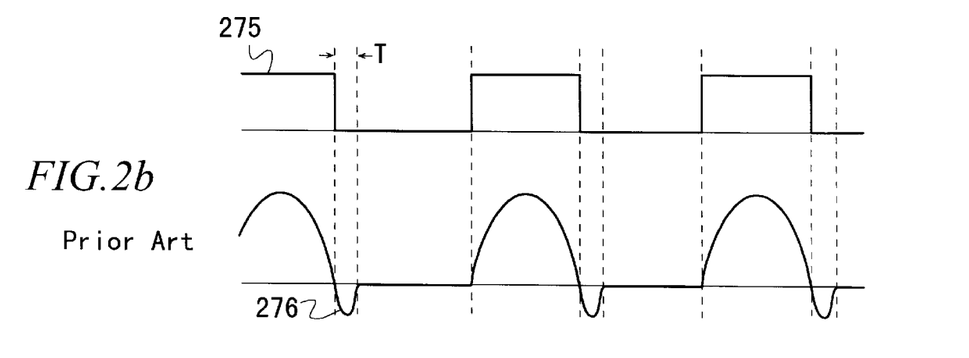

When the switching power supply 202 is under a heavy load as shown in FIG. 2b of the accompanying drawings, a reverse current 276 flows in the secondary side during a period T while the primary transistor $211_1$ is being turned off with no gate voltage 275 applied thereto. Since the reverse current 276 flowing in the secondary side during the period T also flows into the primary side that is coupled to the secondary side by the transformer 207, the reverse current 276 cancels a partial resonant current (zero-voltage switching current) flowing in the primary side.

As a result, the first and second primary transistors $211_1$, $211_2$ operate out of a resonant state, thereby resulting in an increased loss.

SUMMARY OF THE INVENTION

It is therefore an object of the present invention to provide a switching power supply which is capable of controlling a voltage induced across the secondary winding of a transformer with a low loss.

In order to achieve the above object, there is provided in accordance with an aspect of the present invention a switching power supply comprising a transformer having a primary winding and a secondary winding which are magnetically coupled to each other, a primary transistor for supplying a switching current to the primary winding to induce a voltage across the secondary winding, and a secondary rectifying circuit for rectifying the voltage induced across the secondary winding to output a DC voltage from an output terminal, the secondary rectifying circuit comprising a secondary transistor which comprises a MOS transistor, and a secondary control circuit for controlling a voltage at a gate terminal of the secondary transistor, the secondary control circuit being arranged to apply a voltage to the gate terminal of the secondary transistor in synchronism with a voltage induced across the secondary winding to operate the secondary transistor in a third quadrant for rectifying the voltage induced across the secondary winding.

The secondary control circuit is arranged to forcibly stop the secondary transistor from operating in the third quadrant after elapse of a predetermined period.

The secondary control circuit comprises an operational amplifier for determining polarities of the voltage induced across the secondary winding to apply the voltage to the gate terminal of the secondary transistor for enabling the secondary transistor to start to operate in the third quadrant, the operational amplifier having an inverting input terminal and a noninverting input terminal, further comprising a clamping diode connected between the inverting input terminal and the noninverting input terminal, the arrangement being such that when a signal is applied to the operational amplifier to turn off the secondary transistor, the clamping diode is conducted.

The secondary control circuit is arranged to forcibly keep the secondary transistor de-energized for a predetermined period after the secondary transistor has stopped operating in the third quadrant.

The secondary control circuit is arranged to forcibly keep the secondary transistor de-energized for a predetermined period after the secondary transistor has stopped operating in the third quadrant.

The secondary control circuit has an auxiliary power supply circuit for supplying electric energy from the secondary winding to the secondary control circuit to operate the secondary transistor.

The secondary transistor comprises an n-channel MOS transistor, the auxiliary power supply circuit being arranged to apply a voltage higher than the voltage outputted from the output terminal to the gate terminal of the secondary transistor.

The transformer comprises first and second primary windings which are connected respectively to first and second primary transistors, and the transistor comprises first and second secondary windings which are connected respectively to first and second secondary transistors, and each of the first and second secondary transistors is controlled by the secondary control circuit, and a current flows alternately through the first and second secondary windings when the first and second primary transistors are alternately conducted and an alternating current flows through the first and second primary windings.

The secondary control circuit is arranged to forcibly stop the first and second secondary transistors from operating in the third quadrant after elapse of a predetermined period.

The secondary control circuit comprises first and second operational amplifiers for determining polarities of the voltage induced across the first and second secondary windings to apply the voltage to the gate terminals of the first and second secondary transistors for enabling the first and second secondary transistors to start to operate in the third quadrant, the first and second operational amplifiers having inverting input terminals and noninverting input terminals, further comprising first and second clamping diodes connected between the inverting input terminals and the noninverting input terminals, the arrangement being such that when a signal is applied to the first and second operational amplifiers to turn off the first and second secondary transistors, the first and second clamping diodes are conducted.

The secondary control circuits is arranged to forcibly keep the first and second secondary transistors de-energized for a predetermined period after the first and second secondary transistors have stopped operating in the third quadrant.

According to another aspect of the present invention, there is provided a method of controlling a voltage induced across a secondary winding of a transformer with a switching current flowing through a primary winding of the transformer, comprising the steps of connecting a secondary transistor which comprises a MOS transistor to the secondary winding, and controlling a voltage at a gate terminal of the secondary transistor in synchronism with a voltage induced across the secondary winding to operate the secondary transistor in a third quadrant for rectifying the voltage induced across the secondary winding.

The method further comprises the steps of comprising the transformer having first and second primary windings which are connected respectively to first and second primary transistors, and comprising the transformer having first and second secondary windings which are connected respectively to first and second secondary transistors, and controlling each of the first and second secondary transistors with the secondary control circuit so as to flow a current alternately through the first and second secondary windings when the first and second primary transistors are alternately conducted and an alternating current flows through the first and second primary windings.

The method further comprises the step of forcibly stopping the secondary transistor from operating in the third quadrant after elapse of a predetermined period from a time when the secondary transistor has started to operate in the third quadrant.

The method further comprises the step of forcibly keeping the secondary transistor de-energized for a predetermined period after the secondary transistor has stopped operating in the third quadrant.

The method further comprises the step of generating the voltage applied to the gate terminal of the secondary transistor from the voltage induced across the secondary winding.

The primary transistor is switched to supply a switching current to the primary winding, and a voltage induced across the secondary winding which is magnetically coupled to the primary winding is rectified by the secondary rectifying circuit. The secondary control circuit of the secondary rectifying circuit applies a voltage to the gate terminal of the secondary transistor in synchronism with the voltage induced across the secondary winding to operate the secondary transistor in the third quadrant, so that the voltage induced across the secondary winding can be rectified with a low loss.

The secondary control circuit may have an ON timer for establishing a period in which the secondary transistor will operate in the third quadrant. After elapse of the period established by the ON timer, the secondary transistor is forcibly de-energized. If there are two secondary windings for full-wave rectification, a current opposite to the direction of rectification flows through the secondary transistor during a dead time in which the primary transistor is prevented from being energized.

The operational amplifier in the secondary control circuit determines polarities of the voltage induced across the secondary winding. Based on the determined polarities, a voltage is applied to the gate terminal of the secondary transistor to start operating the secondary transistor in the third quadrant. The clamping diode is connected between the inverting and noninverting input terminals of the operational amplifier. When a signal is applied to the operational amplifier to de-energize the secondary transistor, the clamping diode is conducted. With this arrangement, since the voltage difference between the inverting and noninverting input terminals of the operational amplifier will not be greater than a forward conduction voltage for the clamping diode, the operational amplifier can operate at an increased speed.

The secondary control circuit may have an OFF timer for forcibly keeping the secondary transistor de-energized for a predetermined period after the secondary transistor has stopped operating in the third quadrant. The secondary transistor can thus reliably be held in a de-energized state even when ringing occurs in the secondary winding.

The gate voltage applied to operate the secondary transistor in the third quadrant may be supplied from the auxiliary power supply circuit which acquires electric energy from the secondary winding.

The method further comprises the steps of comprising the transformer having first and second primary windings which are connected respectively to first and second primary transistors, and comprising the transformer having first and second secondary windings which are connected respectively to first and second secondary transistors, and controlling each of the first and second secondary transistors with the secondary control circuit so as to flow a current alternately through the first and second secondary windings when the first and second primary transistors are alternately conducted and an alternating current flows through the first and second primary windings.

The method further comprises the step of forcibly stopping the first and second secondary transistors from operating in the third quadrant after elapse of a predetermined period from a time when the first and second secondary transistors have started to operate in the third quadrant.

The method further comprises the step of forcibly keeping the first and second secondary transistors de-energized for a predetermined period after the first and second secondary transistors have stopped operating in the third quadrant.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Like or corresponding parts are denoted by like or corresponding reference characters throughout the views.

Figure 3:
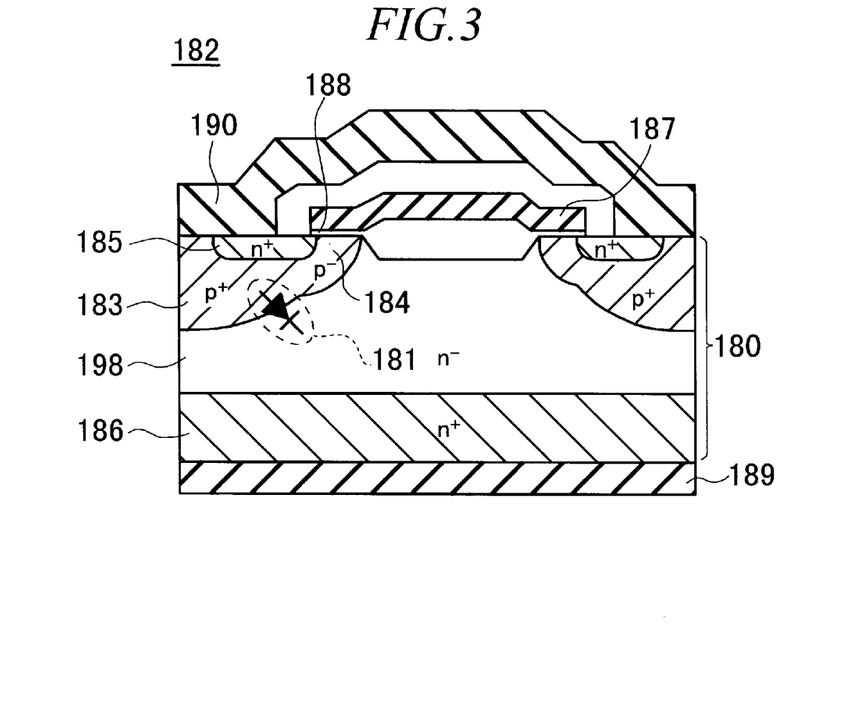
FIG. 3 is a cross-sectional view of a MOS transistor illustrative of its operation in a third quadrant.

According to the present invention, a MOS transistor in a switching power supply operates in a third quadrant. FIG. 3 shows a structure of a general MOS transistor for use in a switching power supply. In FIG. 3, the MOS transistor, generally denoted by 182, is of an n-channel type, and serves as a power device for passing a current vertically across a substrate.

The MOS transistor 182 has an n⁻-type silicon substrate 180 comprising a substrate of a single crystal of silicon and an epitaxial layer disposed on a surface of the substrate. A plurality of p⁺-type body layers 183 are diffused as separate islands in a surface of the silicon substrate 180. A p⁻-type channel layer 184 is diffused in a peripheral region of each of the body layers 183, and an n⁺-type source region 185 is diffused in each of the body layers 183.

An n⁺-type ohmic layer 186 is diffused in a reverse side of the silicon substrate 180. An n⁻-type drain region 198 comprising an epitaxial layer is disposed between the body layer 183 and the ohmic layer 186.

A gate oxide film 188 is disposed on a surface of the channel layer 184, and a gate electrode 187 is disposed on a surface of the gate oxide film 188. A source electrode 190 is disposed on surfaces of the body layer 183 and the source region 185 so as to short-circuit the body layer 183 and the source region 185.

When the gate electrode 187 is placed in a potential which is about the same as the potential at the source electrode 190, the source region 185 and the drain region 198 are electrically isolated from each other. When a voltage higher than the source region 185 is applied to the gate electrode 187, the polarity of the surface of the channel layer 184 is reversed to electrically connect the source region 185 to the drain region 198.

When a voltage is then applied between a drain electrode 189 disposed on a reverse side of the ohmic layer 196 and the source electrode 190, a current flows through the channel layer 184.

A parasitic PN diode 181 is present between the body and channel layers 183, 184 and the drain region 198. While the MOS transistor 182 is in normal use, a positive voltage with respect to the source electrode 190 is applied between the gate electrode 187 and the drain electrode 189 to thereby reverse-bias the parasitic PN diode 181. Therefore, when a positive voltage is applied to the gate electrode 187 to develop a reversed layer, a current flows in the reversed layer from the drain electrode 189 to the source electrode 190. When the positive voltage applied to the gate electrode 187 is removed, the reversed layer is eliminated, turning off the MOS transistor 182.

When the potential at the source electrode 190 is higher than the potential at the drain electrode 189, since the parasitic PN diode 181 is forward-biased, a current flows from the source electrode 190 to the drain electrode 189 even though no reversed layer is developed.

Figure 4:
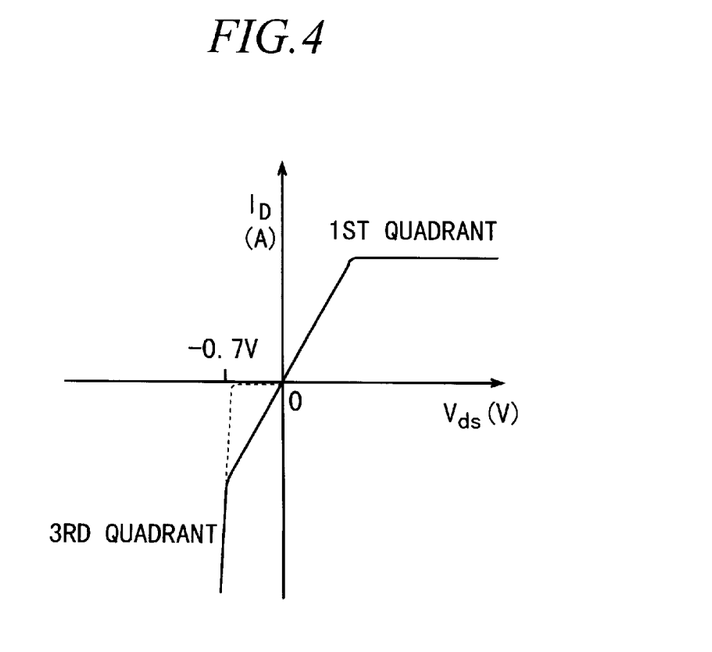
FIG. 4 is a diagram of characteristics of the MOS transistor illustrative of its operation in the third quadrant.

FIG. 4 shows a graph representing such electric characteristics with a constant positive voltage applied between the source electrode 190 and the gate electrode 187. The graph shown in FIG. 4 has a vertical axis indicative of a drain current $I_D$ and a horizontal axis indicative of a voltage $V_{ds}$ between the drain and source electrodes. When the MOS transistor 182 is in normal use with the potential at the drain electrode 189 being higher than the potential at the source electrode 190, the MOS transistor 182 exhibits a resistive property while the voltage $V_{ds}$ is smaller, and a constant current property when the voltage $V_{ds}$ is larger, as represented by the solid-line curve in a first quadrant.

In a third quadrant, the gate voltage remains the same and the potential at the source electrode 190 is higher than the potential at the drain electrode 189. The solid-line curve in the third quadrant represents operation of the MOS transistor 182 in the third quadrant.

While the MOS transistor 182 is operating in the third quadrant, the MOS transistor 182 exhibits a resistive property insofar as the voltage difference between the drain and source electrodes is lower than a forward conduction voltage (about 0.7 V at room temperature) for the parasitic PN diode 181. When the voltage difference between the drain and source electrodes exceeds the forward conduction voltage, the parasitic PN diode 181 is rendered conductive, and the MOS transistor 182 exhibits a diode property.

A dotted-line curve in the third quadrant is plotted when no gate voltage is applied. According to this dotted-line curve, since the MOS transistor 182 operates according to the characteristics of the parasitic PN diode 181, the MOS transistor 182 pass only a small current insofar as the voltage difference between the drain and source electrodes is lower than 0.7 V.

Consequently, when no gate voltage is applied, a voltage loss cannot be reduced lower than the forward conduction voltage for the parasitic PN diode 181.

On the other hand, when a gate voltage is applied to operate the MOS transistor 182 in the third quadrant, the MOS transistor 182 can operate with a voltage lower than the forward conduction voltage for the parasitic PN diode 181.

In this manner, when the potential at the source electrode 190 is higher than the potential at the drain electrode 189, a gate voltage is applied to operate the MOS transistor 182 in the third quadrant with voltages lower than the forward conduction voltage for the parasitic PN diode 181. When the potential at the drain electrode 189 is higher than the potential at the source electrode 190, the application of the gate voltage is stopped, turning off the MOS transistor 182. At this time, the MOS transistor 182 can be used as a low-loss rectifying device.

Figure 5:
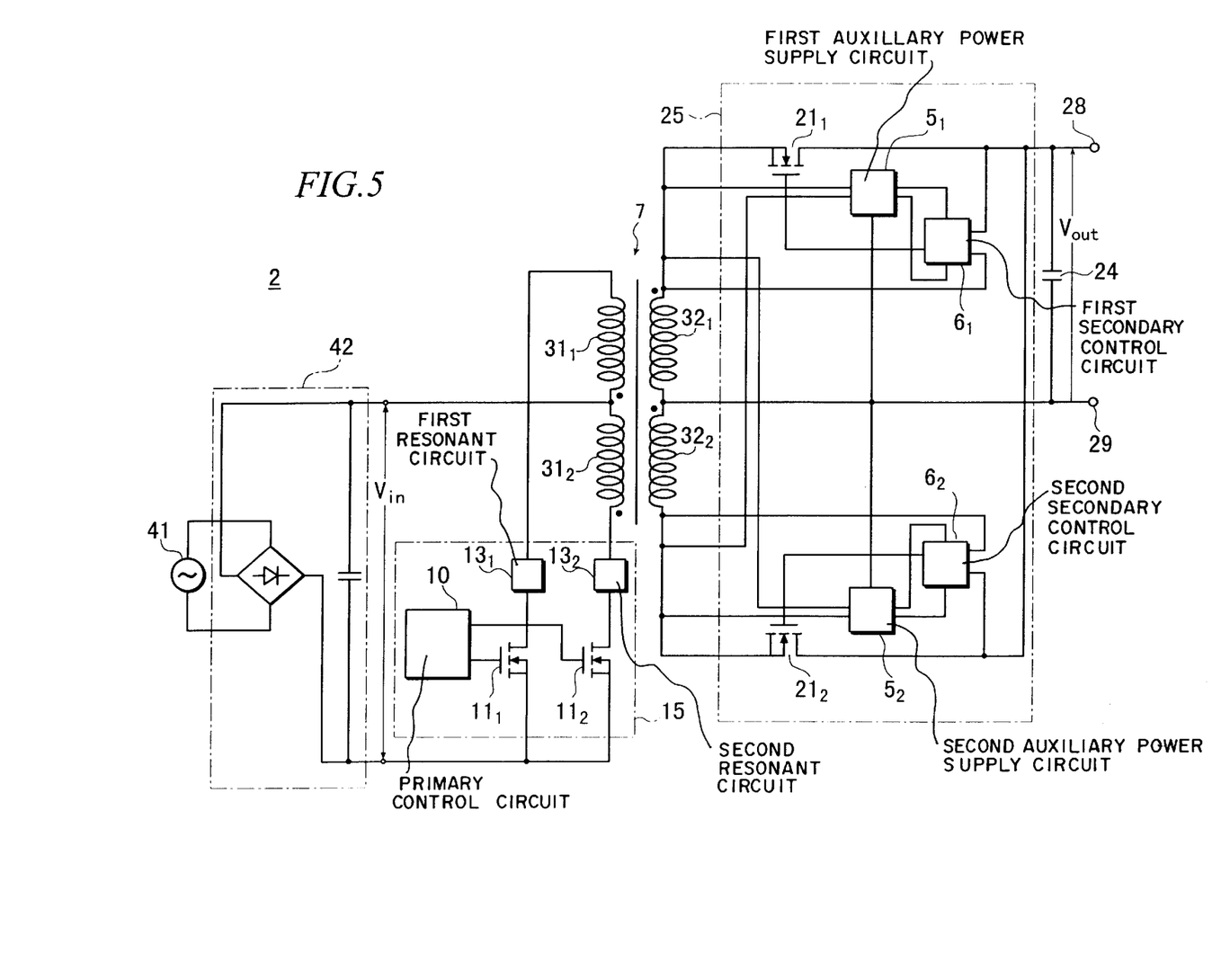
FIG. 5 is a block diagram of a current-resonant-type switching power supply according to the present invention.

FIG. 5 shows in block form a current-resonant-type switching power supply according to the present invention. As shown in FIG. 5, the switching power supply has a transformer 7 comprising first and second primary windings $31_1$, $31_2$ and first and second secondary windings $32_1$, $32_2$ which are magnetically coupled to the first and second primary windings $32_1$, $32_2$.

The switching power supply includes a primary side comprising a primary rectifying and smoothing circuit 42 connected to a commercial power supply 41 and a primary switching circuit 15 for being supplied with a DC voltage $V_{in}$ from the primary rectifying and smoothing circuit 42. The primary switching circuit 15 comprises a primary control circuit 10, first and second resonant circuits $13_1$, $13_2$, and first and second primary transistors $11_1$, $11_2$, each of which comprises an n-channel MOS transistor.

The first and second primary windings $31_1$, $31_2$ have ends connected to each other at a primary central tap that is connected to the primary rectifying and smoothing circuit 42. Other ends of the first and second primary windings $31_1$, $31_2$ are connected through the respective first and second resonant circuits $13_1$, $13_2$ to respective drain terminals of the first and second primary transistors $11_1$, $11_2$.

The first and second primary transistors $11_1$, $11_2$ have respective source terminals connected to each other and to a ground potential terminal of the primary rectifying and smoothing circuit 42. The primary rectifying and smoothing circuit 42 applies a DC voltage $V_{in}$ to the primary central tap of the transformer 7.

The first and second primary transistors $11_1$, $11_2$ are controlled to be alternately rendered conductive by the primary control circuit 10 for supplying a switching current to the first and second primary windings $31_1$, $31_2$. The waveform of the switching current is shaped as a sine wave by the first and second resonant circuits $13_1$, $13_2$ to reduce a power loss of the first and second primary transistors $11_1$, $11_2$.

The switching power supply includes a secondary side comprising a smoothing capacitor 24 and a secondary rectifying circuit 25. The secondary rectifying circuit 25 comprises first and second secondary transistors $21_1$, $21_2$ each comprising an n-channel MOS transistor, first and second auxiliary power supply circuits $5_1$, $5_2$, and first and second secondary control circuits $6_1$, $6_2$.

The first and second secondary windings $32_1$, $32_2$ have ends connected to each other at a secondary central tap that is connected to a ground terminal 29. Other ends of the first and second secondary windings $32_1$, $32_2$ are connected to respective source terminals of the first and second secondary transistors $21_1$, $21_2$.

The first and second secondary transistors $21_1$, $21_2$ have respective drain terminals connected to each other and to an output terminal 28.

The first and second auxiliary power supply circuits $5_1$, $5_2$ are connected respectively to the first and second secondary windings $32_1$, $32_2$, for supplying electric energy from the first and second secondary windings $32_1$, $32_2$ to the first and second secondary control circuits $6_1$, $6_2$. The first and second secondary control circuits $6_1$, $6_2$ generate voltages higher than voltages induced across the first and second secondary windings $32_1$, $32_2$, and supply the generated voltages to the first and second secondary control circuits $6_1$, $6_2$. The first and second secondary control circuits $6_1$, $6_2$ are thus capable of applying voltages higher than voltages of the source terminals of the first and second secondary transistors $21_1$, $21_2$ to gate terminals of the first and second secondary transistors $21_1$, $21_2$.

The windings $31_1$, $31_2$, $32_1$, $32_2$ are of such polarities that when a current flows through the first primary winding $31_1$ upon conduction of the first primary transistor $11_1$, a positive voltage is induced across the first secondary winding $32_1$ and applied to the source terminal of the first secondary transistor $21_1$, and when a current flows through the second primary winding $31_2$ upon conduction of the second primary transistor $11_2$, a positive voltage is induced across the second secondary winding $32_2$ and applied to the source terminal of the second secondary transistor $21_2$.

At the same time that the positive voltage is applied to the source terminal of the first or second secondary transistor $21_1$, $21_2$ by the first or second secondary winding $31_1$, $31_2$, the first or second secondary control circuit $6_1$, $6_2$ applies a voltage, higher than the potential at the source terminal, to the gate terminal of the first or second secondary transistor $21_1$, $21_2$. Therefore, the first or second secondary transistor $21_1$, $21_2$ to which the gate voltage is applied operates in the third quadrant.

The first or second secondary transistor $21_1$, $21_2$ starts to operate in the third quadrant the instant the voltage is induced across the first or second secondary winding $33_1$, $32_2$. A period (ON period) in which the first or second secondary transistor $21_1$, $21_2$ operates in the third quadrant and a period (OFF period) in which the first or second secondary transistor $21_1$, $21_2$ remains turned off (the first or second secondary transistor $21_1$, $21_2$ does not operate in the third or first quadrant) are established by an ON timer circuit and an OFF timer circuit in the first or second secondary control circuit $6_1$, $6_2$. Therefore, the first and second secondary transistor $21_1$, $21_2$ are not simultaneously turned on for operation in the third or first quadrant. Since the first and second secondary transistor $21_1$, $21_2$ are maintained to operate in the third quadrant or to be turned off by the first and second secondary control circuit $6_1$, $6_2$, the first and second secondary transistor $21_1$, $21_2$ are prevented from operating in error due to ringing of the first and second secondary winding $33_1$, $32_2$.

Figure 6:
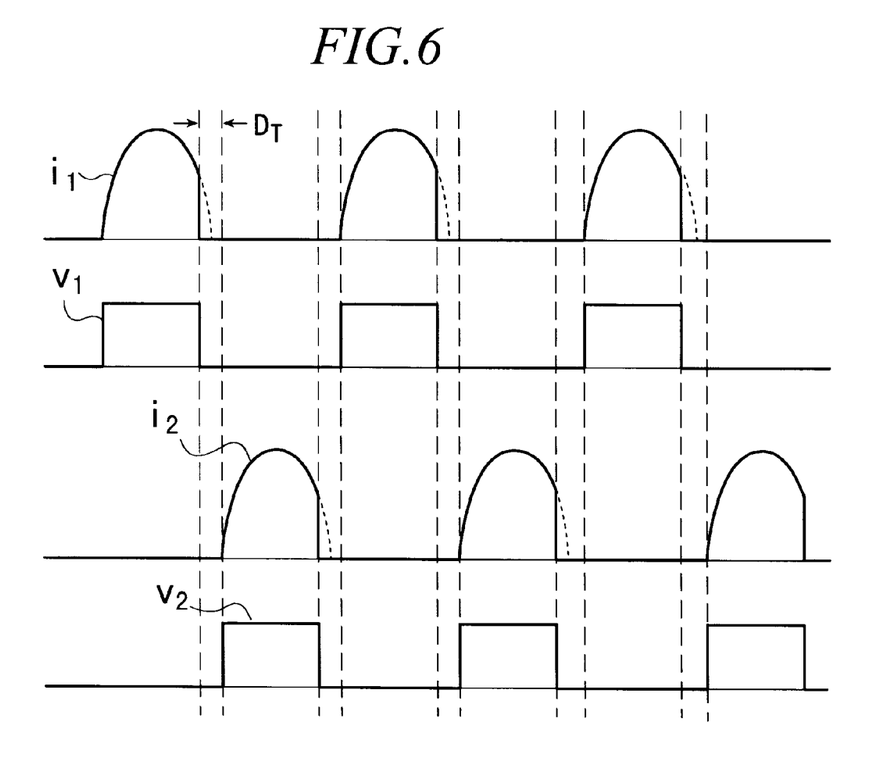
FIG. 6 is a timing chart illustrative of the manner in which the switching power supply shown in FIG. 5 operates.

FIG. 6 shows the waveforms of gate voltages $v_1$, $v_2$ applied respectively to the first and second secondary transistor $21_1$, $21_2$ and the waveforms of currents $i_1$, $i_2$ flowing from the source terminals to the drain terminals thereof. The waveforms of the currents $i_1$, $i_2$ flowing through the first and second secondary transistor $21_1$, $21_2$ are equivalent to a half period of a sine waveform. Before the currents $i_1$, $i_2$ fall to zero, the gate voltages $v_1$, $v_2$ are eliminated, thereby stopping the operation of the first and second secondary transistor $21_1$, $21_2$ in the third quadrant, whereupon the currents $i_1$, $i_2$ stop flowing.

When the currents $i_1$, $i_2$ flow to the first and second secondary transistor $21_1$, $21_2$ and are smoothed by the smoothing capacitor 24, the DC output voltage $V_{out}$ appears between the ground terminal 29 and the output terminal 28.

Figure 7:
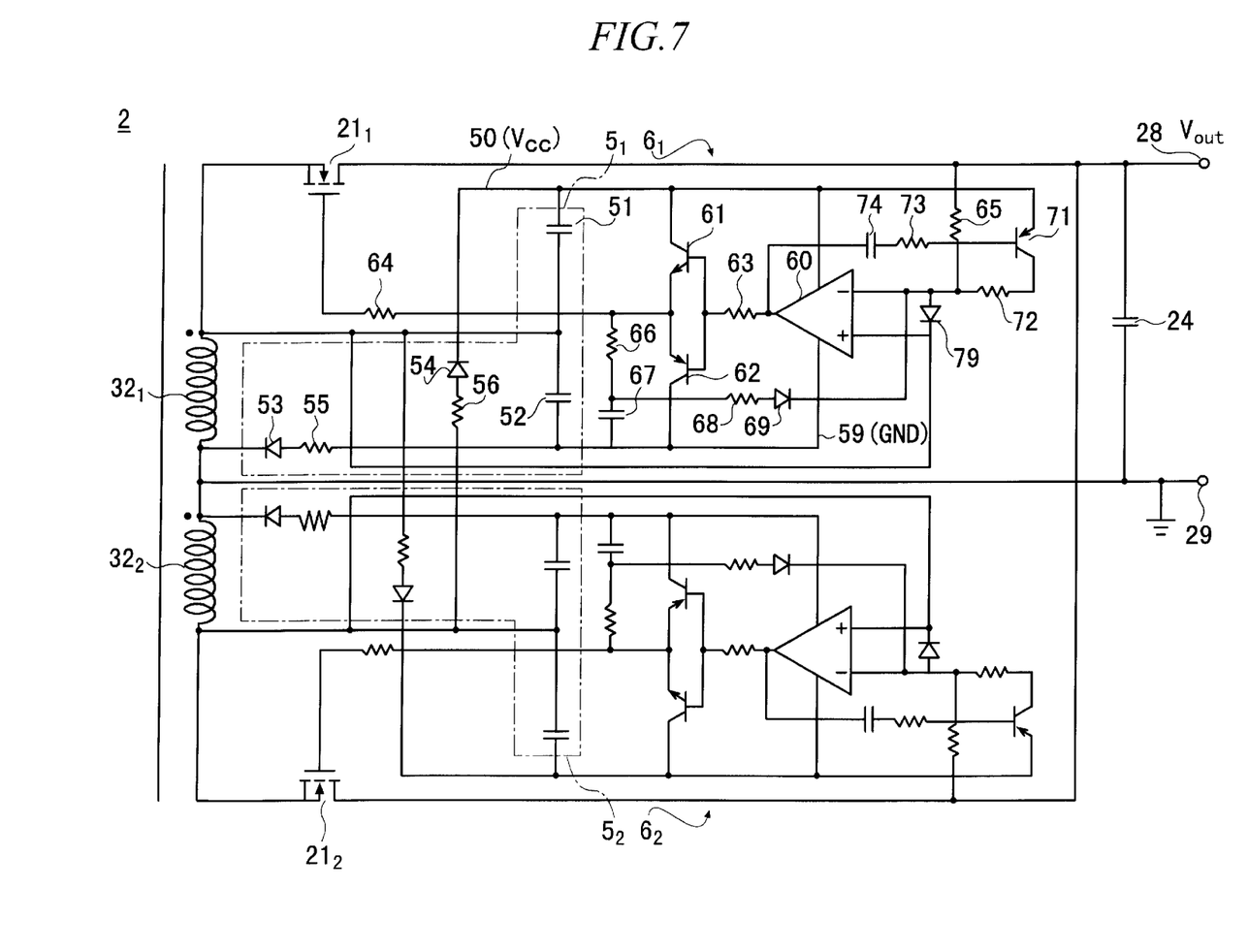
FIG. 7 is a circuit diagram of the switching power supply shown in FIG. 5.

FIG. 7 shows an internal circuit of the switching power supply 2. The above circuit operation will be described below with reference to FIG. 7.

As can be understood from FIG. 7, a circuit arrangement associated with the first secondary transistor $21_1$ is identical to a circuit arrangement associated with the second secondary transistor $21_2$. Therefore, the first secondary control circuits $6_1$ for operating the first secondary transistor $21_1$ and the first auxiliary power supply circuit $5_1$ for supplying electric energy to the first secondary control circuits $6_1$ will be described below, and the second secondary control circuit $6_2$ and the second auxiliary power supply circuit $5_2$ will not be described in detail below.

First, the circuit arrangement of the first auxiliary power supply circuit $5_1$ will be described below.

The first auxiliary power supply circuit $5_1$ comprises two capacitors 51, 52, two diodes 53, 54, and two resistors 55, 56. The first auxiliary power supply circuit $5_1$ uses a line 50 as an auxiliary power supply voltage line and a line 59 as an auxiliary ground line. The first auxiliary power supply circuit $5_1$ supplies electric energy to the first secondary control circuits $6_1$ which is connected between the auxiliary power supply voltage line 50 and the auxiliary ground line 59.

The capacitors 51, 52 have ends connected to each other. The other end of the capacitor 51 is connected to the auxiliary power supply voltage line 50, and the other end of the capacitor 52 is connected to the auxiliary ground line 59. The diode 54 is connected in series with the resistor 56 and has a cathode connected to the auxiliary power supply voltage line 50 and an anode connected to the end of the second secondary winding $32_2$ which is connected to the source terminal of the second secondary transistor $21_2$.

The diode 53 is connected in series with the resistor 55 and has an anode connected to the auxiliary ground line 59 and a cathode connected to the ground terminal 29.

When a voltage is induced across the second secondary winding $32_2$ to apply a positive voltage to the source terminal of the second secondary transistor $21_2$, a current flows through the resistor 56 and the diode 54 to the auxiliary power supply voltage line 50 for thereby charging the capacitors 51, 52. The charging current flows through the diode 53 and the resistor 55 back to the second secondary winding 32$_2$.

The junction between the diodes 51, 52 is connected to the end of the first secondary winding 32$_1$ which is connected to the source terminal of the first secondary transistor 21$_1$. When a voltage is induced across the first secondary winding 32$_1$ to apply a positive voltage to the source terminal of the first secondary transistor 21$_1$, a current flows to charge the capacitor 52 connected to the auxiliary ground line 59, and then flows through the diode 53 and the resistor 55 back to the first secondary winding 32$_1$.

Therefore, an auxiliary power supply voltage V$_{cc}$ between the auxiliary power supply voltage line 50 and the auxiliary ground line 59 is equal to the sum of the voltages across the capacitors 51, 52. The auxiliary power supply voltage V$_{cc}$ is greater than the positive voltage applied to the source terminal of the first secondary transistor 21$_1$ by the voltage across the capacitor 51 connected to the auxiliary power supply voltage line 50 (V$_{out}$<V$_{cc}$).

The capacitors 51, 52 are prevented from being discharged toward the first and second secondary windings 32$_1$, 32$_2$ by the respective diodes 54, 53.

The circuit arrangement of the secondary control circuit 6$_1$ will be described below.

The secondary control circuit 6$_1$ comprises an operational amplifier 60, resistors 63, 64, 65, 66, 68, an NPN transistor 61, a PNP transistor 62, a capacitor 67, and a diode 69.

The operational amplifier 60 has an inverting input terminal connected through the resistor 65 to the drain terminal (the output terminal 28) of the first secondary transistor 21$_1$, and a noninverting input terminal connected to the source terminal of the first secondary transistor 21$_1$.

When the potential at the source terminal of the first secondary transistor 21$_1$ is made higher than the potential at the drain terminal thereof by a voltage induced across the first secondary winding 32$_1$, the operational amplifier 60 outputs a high signal at its output terminal.

The NPN transistor 61 has a base terminal which is connected to the base terminal of the PNP transistor 62. The output terminal of the operational amplifier 60 is connected through the resistor 63 to the junction between the base terminals of the transistors 61, 62.

The NPN transistor 61 has a collector terminal connected to the auxiliary power supply voltage line 50, and the PNP transistor 62 has a collector terminal connected to the auxiliary ground line 59. The NPN transistor 61 and the PNP transistor 62 have respective emitter terminals connected to each other and also to the gate terminal of the first secondary transistor 21$_1$ through the resistor 64.

When the operational amplifier 60 outputs a high signal, the PNP transistor 62 is turned off, and the NPN transistor 61 is turned on. When the NPN transistor 61 is turned on, a voltage, which is substantially the same as the auxiliary power supply voltage V$_{cc}$, is applied through the resistor 64 to the gate terminal of the first secondary transistor 21$_1$.

At this time, the potential at the source terminal of the first secondary transistor 21$_1$ is higher than the potential at the drain terminal thereof, and the auxiliary power supply voltage V$_{cc}$ is higher than the voltage applied to the source terminal of the first secondary transistor 21$_1$. Therefore, the first secondary transistor 21$_1$ starts operating in the third quadrant.

As described above, when a voltage is induced across the first secondary winding 32$_1$ to apply a positive voltage to the source terminal of the first secondary transistor 21$_1$, the operational amplifier 60 and the NPN transistor 61 immediately operate to cause the first secondary transistor 21$_1$ to operate in the third quadrant.

A circuit operation to stop the operation of the first secondary transistor 21$_1$ in the third quadrant will be described below. The resistor 66 and the capacitor 67 which are connected in series with each other jointly make up an ON timer circuit. The end of the resistor 66 remote from the capacitor 67 is connected to the junction between the emitter terminals of the NPN transistor 61 and the PNP transistor 62, and the end of the capacitor 67 remote from the resistor 66 is connected to the auxiliary ground line 59.

The junction between the resistor 66 and the capacitor 67 is connected through the resistor 68 to the anode of the diode 69, whose cathode is connected to the inverting input terminal of the operational amplifier 60.

When the NPN transistor 61 is turned on, applying the auxiliary power supply voltage V$_{cc}$ to the gate terminal of the first secondary transistor 21$_1$, the capacitor 67 is charged through the resistor 66, starting to increase the potential at the inverting input terminal of the operational amplifier 60.

Since the potential at the noninverting input terminal of the operational amplifier 60 is the same as the potential at the source terminal of the first secondary transistor 21$_1$, when the potential at the inverting input terminal of the operational amplifier 60 becomes higher than the potential at the noninverting input terminal of the operational amplifier 60 after elapse of a time (ON period) determined by the capacitance of the capacitor 67 and the resistance of the resistor 66, the output signal from the operational amplifier 60 changes from a high level to a low level.

When the operational amplifier 60 outputs a low signal, the NPN transistor 61 is turned off, and the PNP transistor 62 is turned on. The potential at the gate terminal of the first secondary transistor 21$_1$ becomes lower than the potential at the source terminal thereof. The first secondary transistor 21$_1$ now finishes its operation in the third quadrant, and is rendered nonconductive.

When the PNP transistor 62 is turned on, the capacitor 67 of the ON timer circuit starts being discharged through the PNP transistor 62, and the voltage across the capacitor 67 is lowered. Since the diode 69 is reverse-biased, the potential at the inverting input terminal of the operational amplifier 60 does not drop.

The period in which the operational amplifier 60 outputs a high signal, i.e., the period (ON period) in which the first secondary transistor 21$_1$ operates in the third quadrant, can be established by the capacitance of the capacitor 67 and the resistance of the resistor 66 of the ON timer circuit. With the switching power supply circuit 2, it is possible to prevent the period in which the first secondary transistor 21$_1$ operates in the third quadrant and the period in which the second secondary transistor 21$_2$ operates in the third quadrant from overlapping each other.

An OFF timer circuit for keeping the first secondary transistor 21$_1$ de-energized will be described below.

The OFF timer circuit is included in the secondary control circuit 6$_1$ and comprises a PNP transistor 71, resistors 72, 73, a capacitor 74, and a clamping diode 79.

The PNP transistor 71 has an emitter terminal connected to the auxiliary power supply voltage line 50 and a collector terminal connected through the resistor 72 to the inverting input terminal of the operational amplifier 60.

To the base terminal of the PNP transistor 71, there is connected an end of a series-connected circuit of the resistor 73 and the capacitor 74, whose other end is connected to the output terminal of the operational amplifier 60.

When the output signal from the operational amplifier 60 changes from a high level to a low level, a current limited by the resistor 73 flows from the base terminal of the PNP transistor 71 into the capacitor 74. The current becomes a base current for the PNP transistor 71, which is then rendered conductive for thereby connecting the inverting input terminal of the operational amplifier 60 to the auxiliary power supply voltage line 50.

The clamping diode 79 has an anode connected to the inverting input terminal of the operational amplifier 60 and a cathode connected to the noninverting input terminal of the operational amplifier 60. A current flows from the auxiliary power supply voltage line 50 through the NPN transistor 71 and the clamping diode 79 into the capacitor 52.

Therefore, the noninverting input terminal of the operational amplifier 60 attains the potential across the capacitor 52 and the inverting input terminal thereof attains a potential which is equal to the sum of the potential at the noninverting input terminal of the operational amplifier 60 and a forward conduction voltage (about 0.7 V) for the clamping diode 79.

While the PNP transistor 71 is being energized, the potential at the inverting input terminal of the operational amplifier 60 is higher than the potential at the noninverting input terminal thereof. The low signal remained outputted from the operational amplifier 60, so that the first secondary transistor $21_1$ will not be turned on (OFF period).

Because the potential difference between the inverting and noninverting input terminals of the operational amplifier 60 will not become greater than the forward conduction voltage for the clamping diode 79, the bias for the input terminals of the operational amplifier 60 is low, and the speed of operation of the operational amplifier 60 will not be lowered when the output signal thereof changes from a low level to a high level.

The OFF period ends as follows: Since the base current flowing into the PNP transistor 71 flows into the capacitor 74, the capacitor 74 is charged, progressively increasing the potential at the base terminal of the PNP transistor 71. When the base and emitter terminals of the PNP transistor 71 can no longer be conducted, the PNP transistor 71 is turned off. The output voltage $V_{out}$ is now applied through the resistor 65 to the inverting input terminal of the operational amplifier 60, which outputs a low signal to operate the first secondary transistor $21_1$ in the third quadrant.

The period in which the PNP transistor 71 is conducted, i.e., the period (OFF period) in which the first secondary transistor $21_1$ cannot operate in the third quadrant, can freely be established by the resistance of the resistor 73 and the capacitance of the capacitor 74 of the OFF timer circuit.

When the first secondary transistor $21_1$ is turned off, and the second secondary transistor $21_2$ operates in the third quadrant, with a current flowing through the second secondary winding $32_2$, the potential at the source terminal of the first secondary transistor $21_1$ is lower than the potential at the drain terminal thereof. At this time, since the operational amplifier 60 outputs a low signal, the first secondary transistor $21_1$ remains turned off, and will not operate in the first quadrant.

Operation of the switching power supply 2 to make its output voltage $V_{out}$ constant will be briefly described below. In order to make the output voltage $V_{out}$ constant, the output voltage $V_{out}$ is sampled and fed back to the primary side by a photocoupler or the like for controlling the operation of the first and second transistors $11_1$, $11_2$. Even if the load on the switching power supply 2 changes, therefore, the output voltage $V_{out}$ is made constant.

The switching power supply 2 having a push-pull resonant circuit has been described above. However, the principles of the present invention are also applicable to switching power supplies of other types.

Figure 8:
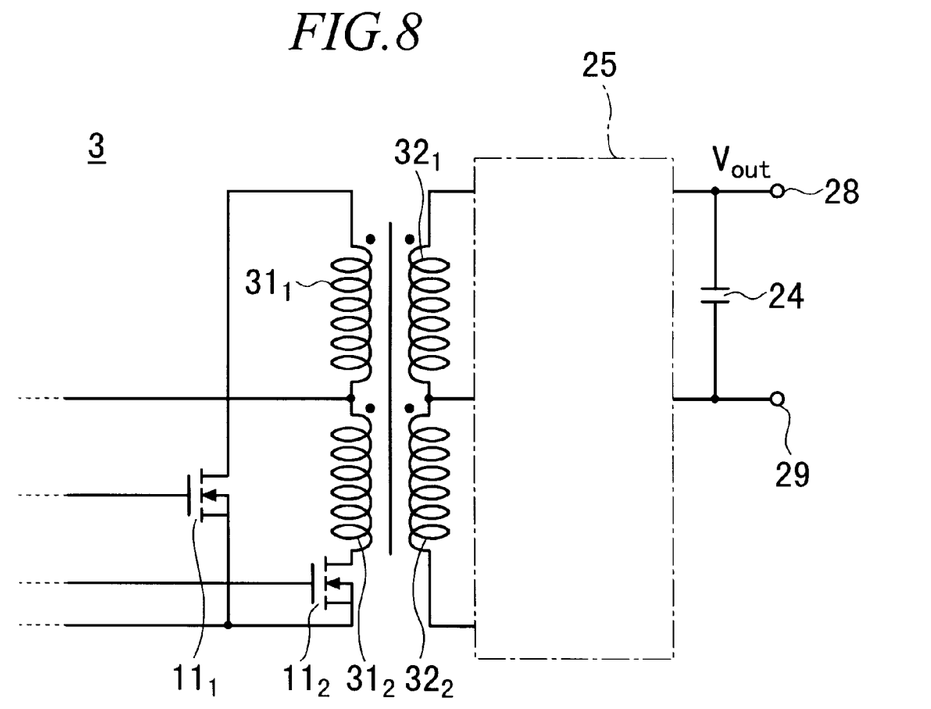
FIG. 8 is a block diagram of a push-pull-type switching power supply according to the present invention.

FIG. 8 shows a switching power supply 3 of another type according to the present invention. The switching power supply 3 shown in FIG. 8 is a push-pull-type switching power supply for producing a rectangular-wave current, and similar to the switching power supply 2 shown in FIG. 5 except that the resonant circuits $13_1$, $13_2$ are dispensed with.

In the switching power supply 3, the period in which the first secondary transistor $21_1$ operates in the third quadrant and the period in which the second secondary transistor $21_2$ operates in the third quadrant are prevented from overlapping each other.

Figure 9:
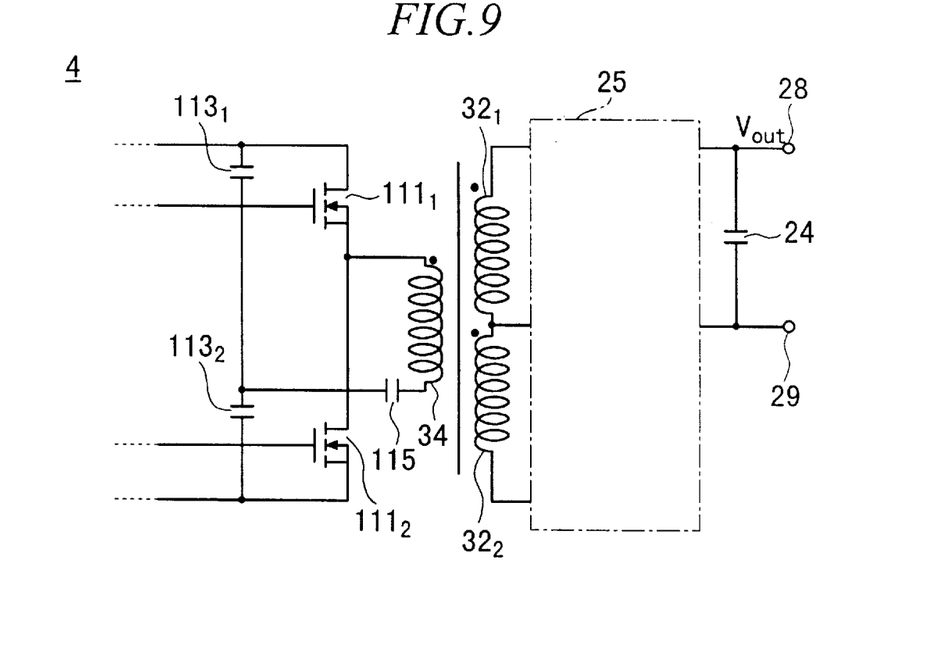
FIG. 9 is a block diagram of a half-bridge-type switching power supply according to the present invention.

FIG. 9 shows a switching power supply 4 of still another type according to the present invention. The switching power supply 4 shown in FIG. 9 is a half-bridge-type switching power supply. The switching power supply 4 has a secondary circuit, which includes the secondary windings $32_1$, $32_2$, the secondary rectifying circuit 25, and the smoothing capacitor 24, identical to those of the switching power supplies 2, 3, and a primary circuit comprising a primary winding 34, two primary transistors $111_1$, $111_2$, and three transistors $113_1$, $113_2$, 115. 10 The primary transistors $111_1$, $111_2$ and the transistors $113_1$, $113_2$ are connected in series with each other, and these series-connected circuits are connected parallel to each other. The primary rectifying and smoothing circuit 42 applies a voltage to these series-connected circuits.

A series-connected circuit of the primary winding 34 and the capacitor 115 is connected to the junctions between the series-connected circuits of the primary transistors $111_1$, $111_2$ and the transistors $113_1$, $113_2$. The primary rectifying and smoothing circuit 42 applies voltages to the series-connected circuits of the primary transistors $111_1$, $111_2$ and the transistors $113_1$, $113_2$. When the primary transistor $111_1$ to which a higher voltage is applied is turned on, a current is supplied from the primary rectifying and smoothing circuit 42 to the primary winding 34, charging the capacitors 115, $113_2$. When the primary transistor $111_2$ to which a lower voltage is applied is turned on, the charged capacitors 115, $113_2$ start being discharged, supplying a reversed current to the primary winding 34.

Since an alternating current flows through the primary winding 34, a current flows alternately through the first and second secondary windings $32_1$, $32_2$, so that a DC voltage smoothed by the smoothing capacitor 24 appears between the output terminal 28 and the ground terminal 29.

The secondary control circuit 25 of each of the switching power supplies 2, 3, 4 has the auxiliary power supply circuit $5_1$ or $5_2$ for acquiring electric energy from the first and second secondary windings $32_1$, $32_2$. However, the present invention is not limited to such an arrangement.

Figure 10:
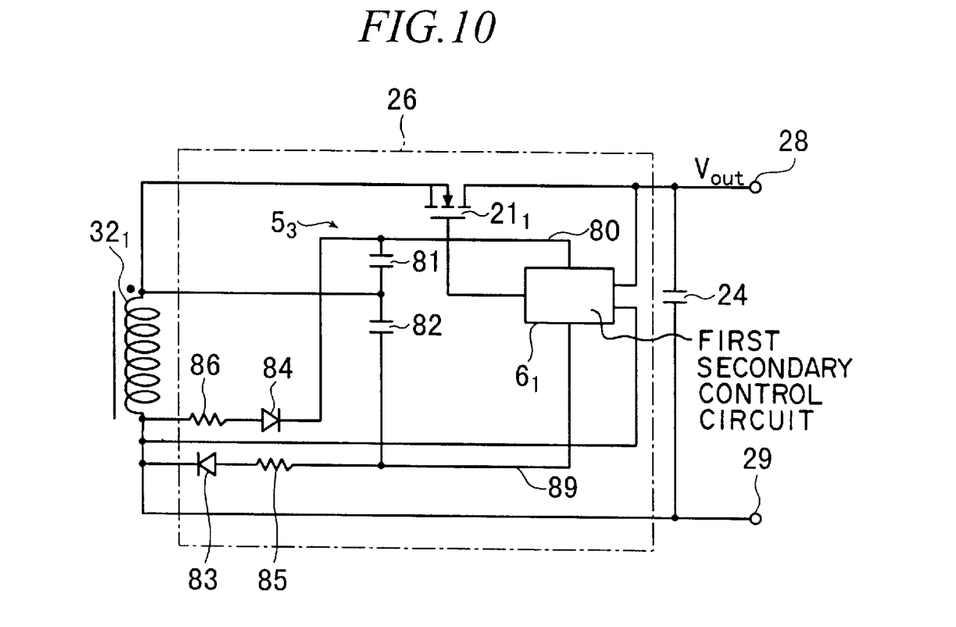
FIG. 10 is a circuit diagram of an auxiliary power supply circuit.

FIG. 10 shows another auxiliary power supply circuit incorporated in a secondary rectifying circuit 26. Those parts of the secondary rectifying circuit 26 which are identical to those of the secondary rectifying circuit 25 are denoted by identical reference characters, and will not be described in detail below.

The secondary rectifying circuit 26 has the first secondary transistor $21_1$, the first secondary control circuit $6_1$, and an auxiliary power supply circuit $5_3$ for acquiring electric energy from the first secondary winding $32_1$.

The auxiliary power supply circuit $5_3$ comprises two capacitors 81, 82, two diodes 83, 84, and two resistors 85, 86. The auxiliary power supply circuit $5_3$ serves to apply a power supply voltage $V_{cc}$ generated between an auxiliary power supply voltage line 80 and an auxiliary ground line 89 to the first secondary control circuit $6_1$.

The capacitors 81, 82 are connected in series with each other between the auxiliary power supply voltage line 80 and the auxiliary ground line 89. The diode 83 has a cathode connected to the end of the first secondary winding $32_1$ which is connected to the ground terminal, and an anode connected through the resistor 85 to the auxiliary ground line 89.

The junction between the capacitors 81, 82 is connected to the end of the first secondary winding $32_1$ which is connected to the source terminal of the first secondary transistor $21_1$. When a voltage is induced across the first secondary winding $32_1$ to apply a positive voltage to the source terminal of the first secondary transistor $21_1$, a current flows from the end of the first secondary winding $32_1$ which is connected to the source terminal of the first secondary transistor $21_1$, into the capacitor 82. After charging the capacitor 82, the current flows through the resistor 85 and the diode 83 back to the first secondary winding $32_1$.

The diode 84 has a cathode connected to the auxiliary power supply voltage line 80 and an anode connected through the resistor 86 to the end of the first secondary winding $32_1$ which is connected to the ground terminal 29. When a voltage is induced across the first secondary winding $32_1$ to apply a negative voltage to the source terminal of the first secondary transistor $21_1$, a current flows from the end of the first secondary winding $32_1$ which is connected to the ground terminal 29, through the capacitor 86 and the diode 84 into the capacitor 81. After charging the capacitor 81, the current flows from the junction between the capacitors 81, 82 back to the first secondary winding $32_1$.

Consequently, the capacitors 81, 82 are alternately charged by an induced AC electromotive force generated across the first secondary winding $32_1$, and the power supply voltage $V_{cc}$ of the auxiliary power supply voltage line 80 is equal to the sum of the voltages across the capacitors 81, 82. Therefore, the power supply voltage $V_{cc}$ is high enough to apply a voltage higher than the voltage at the source terminal of the first secondary transistor $21_1$ to the gate terminal thereof.

Another switching power supply which has a secondary rectifying circuit 26 comprising the auxiliary power supply circuit $5_3$ and the first (or second) secondary control circuit $6_1$ will be described below.

Figure 11:
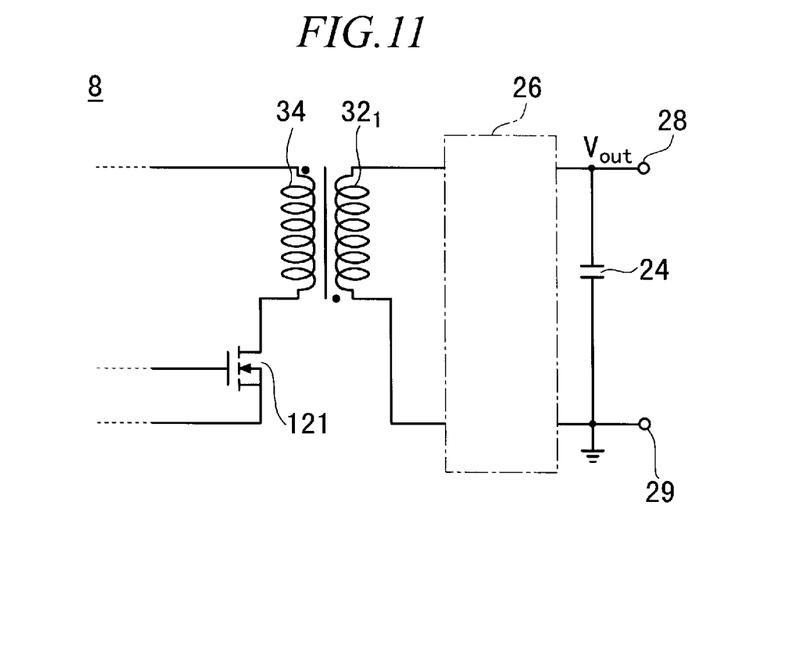
FIG. 11 is a block diagram of a flyback-type switching power supply having the auxiliary power supply circuit according to the present invention.

FIG. 11 shows a flyback-type switching power supply 8 according to the present invention. As with the arrangement shown in FIG. 10, the flyback-type switching power supply 8 comprises the first secondary winding $32_1$, the secondary rectifying circuit 26, and the smoothing capacitor 24 in the secondary side.

In the primary side, the flyback-type switching power supply 8 comprises the primary winding 34 magnetically coupled to the secondary winding $32_1$, and a primary transistor 121 connected in series with the primary winding 34. When the primary transistor 121 is turned on, a current flows through the primary winding 34.

The primary winding 34 and the first secondary winding $32_1$ are of such polarities that when a current flows through the primary winding 34, the first secondary transistor $21_1$ in the secondary rectifying circuit 26 is turned off, and when the primary transistor 121 changes from an energized state to a de-energized state, the first secondary transistor $21_1$ operates in the third quadrant, causing a current to flow in the first secondary winding $32_1$ for thereby charging the smoothing capacitor 24.

Since the first secondary transistor $21_1$ is forcibly turned off, the flyback-type switching power supply 8 will not be affected by ringing caused of the first secondary winding $32_1$.

Figure 12:
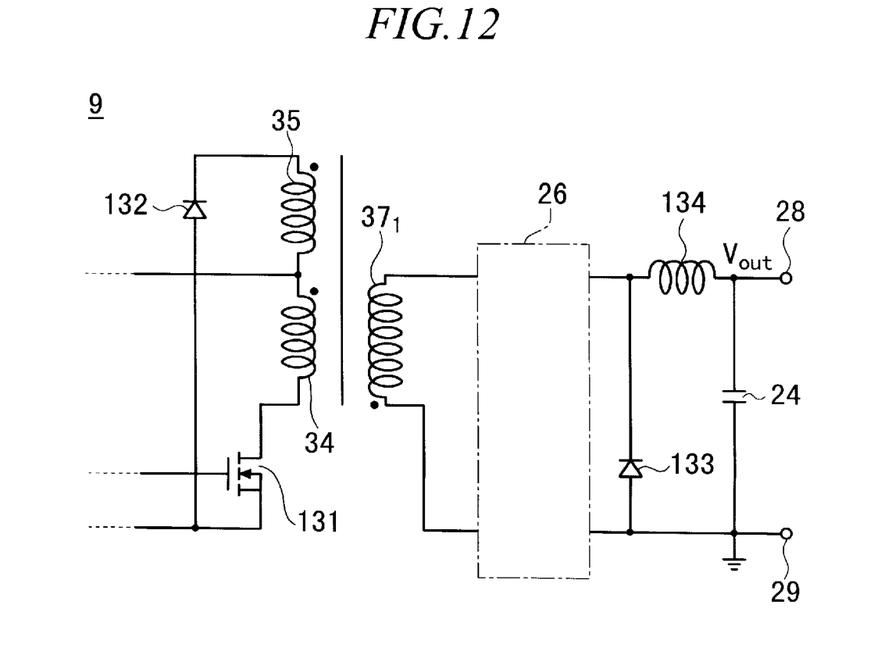
FIG. 12 is a block diagram of a forward-type switching power supply having the auxiliary power supply circuit according to the present invention.

FIG. 12 shows a forward-type switching power supply 9 which comprises the first secondary winding $32_1$, the secondary rectifying circuit 26, and the smoothing capacitor 24. A choke coil 134 is inserted between the secondary rectifying circuit 26 and the smoothing capacitor 24. The choke coil 134 has an end connected to the secondary rectifying circuit 26 and an opposite end connected to the smoothing capacitor 24.

A diode 133 has a cathode connected to the junction between the choke coil 134 and the secondary rectifying circuit 26, and an anode connected to the ground terminal 29.

In the primary side, the forward-type switching power supply 9 comprises the primary winding 34 magnetically coupled to the secondary winding $32_1$, a snubber winding 35, a primary transistor 131 in the form of an n-channel MOS transistor, and a diode 132. The primary winding 34 has an end connected to the drain terminal of the primary transistor 131. The primary rectifying and smoothing circuit 42 applies a DC voltage between the other end of the primary winding 34 and the source terminal of the primary transistor 131.

When the primary transistor 131 is turned on to pass a current through the primary winding 34, the first secondary winding $32_1$ operates in the third quadrant to pass a current through the first secondary winding $32_1$. The current flowing through the first secondary winding $32_1$ charges the capacitor 24 through the choke coil 134.

When the current supplied from the first secondary transistor 21 to the choke coil 134 is cut off, a negative potential is developed at the cathode of the diode 133 by an electromotive force generated by the choke coil 134, and the capacitor 24 is charged by a current generated due to the electric energy stored in the choke coil 134. Since the charging current flowing into the capacitor 24 is averaged, any ripple of the output voltage $V_{out}$ is reduced.

However, inasmuch as the primary winding 34 includes a leakage inductive component, a high voltage is applied to the drain terminal of the primary transistor 131 when the primary transistor 131 is turned off.

In the switching power supply 9, the snubber winding 35 has an end connected to a higher-voltage end of the primary winding 34 and another end connected to the cathode of the diode 132, whose anode is connected to the source terminal of the primary transistor 131.

The snubber winding 35 is magnetically coupled to the primary winding 34 and the first secondary winding $32_1$. Due to an electromotive force generated by the leakage inductive component of the primary winding 34, a voltage is induced across the snubber winding 35, developing a negative potential at the cathode of the diode 132. A current now flows from the source terminal of the primary transistor 131 through the diode 132 and the snubber winding 35 for thereby returning the electric energy stored by the leakage inductive component of the primary winding 34 to the primary rectifying and smoothing circuit 42.

In the secondary rectifying circuits 25, 26, the first secondary transistor $21_1$ comprises an n-channel MOS transistor. However, the first secondary transistor $21_1$ may comprise a p-channel MOS transistor, which operates in the third quadrant when a current flows through the secondary winding.

The switching power supply according to the present invention offers the following advantages:

Since the secondary rectifying circuit suffers a small loss, the switching power supply is highly efficient.

Because the operation of the secondary transistors in the third quadrant is forcibly brought to an end, the periods in which the two secondary transistors are energized do not overlap each other.

Inasmuch as the period in which the secondary transistors remain de-energized can be established, the secondary transistors will not be energized even when ringing occurs in the secondary windings.

The switching frequency can be increased because the operational amplifiers in the secondary control circuits can operate at a high speed.

Although certain preferred embodiments of the present invention have been shown and described in detail, it should be understood that various changes and modifications may be made therein without departing from the scope of the appended claims.

What is claimed is:

1. A switching power supply comprising:
    a transformer having a primary winding and a secondary winding which are magnetically coupled to each other;
    a primary transistor for supplying a switching current to said primary winding to induce a voltage across said secondary winding; and
    a secondary rectifying circuit for rectifying the voltage induced across said secondary winding to output a DC voltage from an output terminal;
    said secondary rectifying circuit comprising:
        a secondary transistor which comprises a MOS transistor; and
        a secondary control circuit for controlling a voltage at a gate terminal of said secondary transistor;
    said secondary control circuit being arranged to apply a voltage to the gate terminal of said secondary transistor in synchronism with a voltage induced across said secondary winding to operate said secondary transistor in a third quadrant for rectifying the voltage induced across said secondary winding; and
    said secondary control circuit comprising an ON timer for establishing predetermined ON period in which operating said secondary transistor in third quadrant.

2. A switching power supply according to claim 1, wherein said transformer comprises first and second primary windings which are connected respectively to first and second primary transistors; and
    said transformer comprises first and second secondary windings which are connected respectively to first and second secondary transistors; and
    each of said first and second secondary transistors is controlled by said secondary control circuit; and
    a current flows alternately through said first and second secondary windings when said first and second primary transistors are alternately conducted and an alternating current flows through said first and second primary windings; and
    said secondary control circuit comprising an ON timer for establishing predetermined ON period in which operating said secondary transistor in third quadrant.

3. A switching power supply according to claim 1, wherein said secondary control circuit comprising an OFF timer for keeping the said secondary transistor forcibly de-energized for predetermined OFF period after stopped operation of said secondary transistor in third quadrant.

4. A switching power supply according to claim 2, wherein said secondary control circuit comprising an OFF timer for keeping the said secondary transistor forcibly de-energized for predetermined OFF period after stopped operation of said secondary transistor in third quadrant.

5. A switching power supply according to claim 1, wherein said secondary control circuit comprises an operational amplifier for determining polarities of the voltage induced across said secondary winding to apply the voltage to the gate terminal of said secondary transistor for enabling said secondary transistor to start to operate in the quadrant, said operational amplifier having an inverting input terminal and a noninverting input terminal, further comprising a clamping diode connected between said inverting input terminal and said noninverting input terminal, the arrangement being such that when a signal is applied to said operational amplifier to turn off said secondary transistor, said clamping diode is conducted.

6. A switching power supply according to claim 2, wherein said secondary control circuit comprises first and second operational amplifiers for determining polarities of the voltage induced across said first and second secondary windings to apply the voltage to the gate terminals of said first and second secondary transistors for enabling said first and second secondary transistors to start to operate in the third quadrant, said first and second operational amplifiers having inverting input terminals and noninverting input terminals, further comprising first and second clamping diodes connected between said inverting input terminals and said noninverting input terminals, the arrangement being such that when a signal is applied to said first and second operational amplifiers to turn off said first and second secondary transistors, said first and second clamping diodes are conducted.

7. A switching power supply according to claim 5, wherein said secondary control circuit is arranged to forcibly keep said secondary transistor de-energized for a predetermined period after said secondary transistor has stopped operating in the third quadrant.

8. A switching power supply according to claim 6, wherein said secondary control circuits is arranged to forcibly keep said first and second secondary transistors de-energized for a predetermined period after said first and second secondary transistors have stopped operating in the third quadrant.

9. A switching power supply according to any one of claims 1 through 5, wherein said secondary control circuit has an auxiliary power supply circuit for supplying electric energy from said secondary winding to said secondary control circuit to operate said secondary transistor.

10. A switching power supply according to claim 9, wherein said secondary transistor comprises an n-channel MOS transistor, said auxiliary power supply circuit being arranged to apply a voltage higher than the voltage outputted from said output terminal to the gate terminal of said secondary transistor.

11. A method of controlling a voltage induced across a secondary winding of a transformer with a switching current flowing through a primary winding of the transformer, comprising the steps of:
    connecting a secondary transistor which comprises a MOS transistor to said secondary winding; and controlling a voltage at a gate terminal of said secondary transistor in synchronism with a voltage induced across said secondary winding to operate said secondary transistor in a third quadrant for rectifying the voltage induced across said secondary winding; and establishing said secondary transistor operating in the third quadrant for a predetermined period in which operating said secondary transistor in the third quadrant.

12. A method according to claim 11, further comprising the steps of:

comprising said transformer having first and second primary windings which are connected respectively to first and second primary transistors; and comprising said transformer having first and second secondary windings which are connected respectively to first and second secondary transistors; and controlling each of said first and second secondary transistors with said secondary control circuit so as to flow a current alternately through said first and second secondary windings when said first and second primary transistors are alternately conducted and an alternating current flows through said first and second primary windings; and establishing said secondary transistor operating in the third quadrant for a predetermined period in which operating said secondary transistor in the third quadrant.

13. A method according to claim 11, further comprising the step of:

keeping said secondary transistor forcibly de-energized for a predetermined period after stopped operation of said secondary transistor in third quadrant.

14. A method according to claim 12, further comprising the step of:

keeping said secondary transistor forcibly de-energized for a predetermined period after stopped operation of said secondary transistor in third quadrant.

15. A method according to claim 11, further comprising the step of:

forcibly keeping said secondary transistor de-energized for a predetermined period after said secondary transistor has stopped operating in the third quadrant.

16. A method according to claim 12, further comprising the step of:

forcibly keeping said first and second secondary transistors de-energized for a predetermined period after said first and second secondary transistors have stopped operating in the third quadrant.

17. A method according to any one of claims 11 through 16, further comprising the step of:

generating the voltage applied to the gate terminal of said secondary transistor from the voltage induced across said secondary winding.

\* \* \* \* \*